United States Patent
Martinez et al.

(10) Patent No.: US 9,885,277 B2
(45) Date of Patent: Feb. 6, 2018

(54) COMPRESSION-IGNITION DIRECT-INJECTION COMBUSTION ENGINE AND FUEL INJECTION METHOD FOR SAME

(71) Applicant: IFP Energies nouvelles, Rueil-Malmaison (FR)

(72) Inventors: Lionel Martinez, Maulette (FR); Stephane Richard, Bazainville (FR); Olivier Laget, Rueil-Malmaison (FR)

(73) Assignees: IFP ENERGIES NOUVELLES, Rueil-Malmaison (FR); AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 15/031,393

(22) PCT Filed: Sep. 17, 2014

(86) PCT No.: PCT/EP2014/069801
§ 371 (c)(1),
(2) Date: Apr. 22, 2016

(87) PCT Pub. No.: WO2015/058907
PCT Pub. Date: Apr. 30, 2015

(65) Prior Publication Data
US 2016/0265418 A1   Sep. 15, 2016

(30) Foreign Application Priority Data
Oct. 25, 2013  (FR) ...................................... 13 60426

(51) Int. Cl.
*F02F 3/24* (2006.01)
*F02B 23/06* (2006.01)
(Continued)

(52) U.S. Cl.
CPC ............ *F02B 23/0651* (2013.01); *F02B 1/12* (2013.01); *F02B 23/0669* (2013.01);
(Continued)

(58) Field of Classification Search
CPC .............. F02B 23/0651; F02B 23/0669; F02B 23/0693; F02B 23/0672; F02B 23/0684;
(Continued)

(56) References Cited

U.S. PATENT DOCUMENTS 6,513,487 B1 * 2/2003 Jorach ....................... F02B 1/12
                                                123/269
7,185,614 B2 * 3/2007 Meffert ............... F02B 23/0672
                                                123/269

(Continued)

FOREIGN PATENT DOCUMENTS

DE   10 2011 017479 A1   10/2012
EP       2 615 296 A1    7/2013
(Continued)

OTHER PUBLICATIONS

International Search Report for PCT/EP2014/069801 dated Oct. 20, 2014; English translation submitted herewith (7 Pages).
Written Opinion of the International Search Authority mailed Oct. 20, 2014 (6 Pages).

*Primary Examiner* — Hai Huynh
(74) *Attorney, Agent, or Firm* — Fitch Even Tabin & Flannery LLP

(57) ABSTRACT

The present invention is a compression-ignition direct-injection internal-combustion engine comprising at least a cylinder (10), a cylinder head (12) carrying fuel injection means (14), a piston (16) sliding in this cylinder, a combustion chamber (34) having on one side an upper face (44) of the piston comprising a projection (48) extending in the direction of the cylinder head and located at the center of a concave bowl (46). The engine comprises an injector pro-
(Continued)

jecting fuel in at least two fuel jet sheets with sheet injection angles (A1, A2), a lower sheet (36) of jet axis C1 and an upper sheet (38) of jet axis C2, at least two mixing zones (Z1, Z2) of the combustion chamber. According to the invention, one of the zones comprises a toroidal volume (64) of center B into which fuel jets (40) of the lower jet are injected in such a way that axis C1 of the lower jet is contained between center B and projection (48).

15 Claims, 2 Drawing Sheets

(51) Int. Cl.
    *F02B 1/12*          (2006.01)
    *F02M 61/18*       (2006.01)

(52) U.S. Cl.
    CPC ...... *F02B 23/0672* (2013.01); *F02B 23/0693* (2013.01); *F02M 61/182* (2013.01); *F02M 61/1813* (2013.01); *Y02T 10/125* (2013.01)

(58) Field of Classification Search
    CPC ..... F02B 23/0687; F02B 1/12; F02M 61/182; F02M 61/1813; F02F 3/28; Y02T 10/125
    USPC .......... 123/275, 276, 298, 301, 307
    See application file for complete search history.

(56) References Cited

U.S. PATENT DOCUMENTS

| | | | | |
|---|---|---|---|---|
| 8,272,207 | B2* | 9/2012 | Kurtz | F02D 41/024 123/27 R |
| 8,327,822 | B2* | 12/2012 | Asai | F02B 23/0651 123/298 |
| 8,671,908 | B2* | 3/2014 | Ives | F02B 23/0651 123/145 A |
| 8,677,970 | B2* | 3/2014 | Venugopal | F02B 23/0651 123/193.1 |
| 9,121,336 | B2* | 9/2015 | Lee | F02B 23/0651 |
| 9,284,877 | B2* | 3/2016 | Yoo | F02B 23/0696 |
| 9,429,065 | B2* | 8/2016 | Zoeller | F02B 23/0651 |
| 2005/0120995 | A1* | 6/2005 | Tsujimoto | F02B 23/0669 123/299 |
| 2015/0020765 | A1* | 1/2015 | Pierpont | F02F 3/28 123/27 R |
| 2016/0341106 | A1* | 11/2016 | Richard | F02M 45/086 |
| 2016/0348571 | A1* | 12/2016 | Huang | F02B 43/00 |
| 2017/0082013 | A1* | 3/2017 | Martinez | F02B 23/0669 |

FOREIGN PATENT DOCUMENTS

| | | |
|---|---|---|
| FR | 2 868 480 A1 | 10/2005 |
| FR | 2 912 184 A1 | 8/2008 |
| JP | H05 71347 A | 3/1993 |

\* cited by examiner

COMPRESSION-IGNITION DIRECT-INJECTION COMBUSTION ENGINE AND FUEL INJECTION METHOD FOR SAME

CROSS REFERENCE TO RELATED APPLICATIONS

Reference is made to PCT/EP2014/069801, filed Sep. 17, 2014, and to French Patent Application No. 13 60426 filed on Oct. 25, 2013, which applications are incorporated herein by reference in their entirety.

BACKGROUND OF THE INVENTION

Field of the Invention

The present invention relates to a direct-injection combustion engine, and more particularly to a compression-ignition engine and to a method of using the same and particularly to such an engine which is usable in aircraft or automotive applications, or in the field of stationary equipments such as engine in generators.

Description of the Prior Art

Prior art engines generally comprises at least a cylinder, a piston provided with a projection deposed in a concave bowl and sliding in the cylinder in a reciprocating rectilinear motion, an intake for an oxidizer, burnt gas exhaust, a combustion chamber and injector for injecting a fuel into the combustion chamber.

The design of an engine involves consideration of the performance, pollutant emission and mechanical strength constraints of the combustion chamber which are increasingly high where the meeting of them is different.

Thus, performance increase generally leads to an increase in emissions and higher mechanical stress.

In order to overcome these constraints and to guarantee low emissions and satisfactory mechanical strength over the entire operating range of the engine, in particular at very high load, using all of the oxidizer present in the combustion chamber, for example an oxidizer comprising air at ambient pressure, supercharged air or a mixture of air (supercharged or not) and of recirculated burnt gas, is of great importance.

Indeed, the fuel mixture (oxidizer/fuel) in the combustion chamber needs to be as homogeneous as possible.

In practice, the fuel remains confined in the bowl and it cannot mix with the oxidizer contained notably in the compression area, that is in the volume of the upper part of the combustion chamber defined by the cylinder wall and the face of the cylinder head opposite the piston.

This has the drawback of creating high fuel richness areas in the combustion zone, which generate a high production of soot, carbon oxide (CO) and unburnt hydrocarbons (HC) upon combustion of the fuel mixture.

Furthermore, the thermal load is focused on the re-entrant part of the piston, that is the bowl neck or diameter restriction that marks the transition between the piston and the upper zone encompassing the compression area, which may be limiting at very high loads.

As better described in Japanese patent application 5-71, 347, one solution to overcoming the aforementioned drawbacks is in using fuel injection with jets having at least two injection angles and a piston comprising a bowl having two combustion volumes.

This allows using a larger amount of oxidizer compared to conventional engines and to distributing the thermal load over a larger surface area of the combustion chamber.

However, this configuration does not allow optimizing the internal aerodynamics in order to use all of the oxidizer available in the two combustion volumes and to minimize overlap between the fuel jets from the various sheets. Finally, this configuration does not minimize the liquid fuel deposit on the cylinder wall.

The present invention improves the quality of the mixture to obtain performance gains, together with significant consumption and emission (CO, nitrogen oxides, unburnts, soot) gains.

SUMMARY OF THE INVENTION

The invention therefore relates to a compression-ignition direct-injection internal-combustion engine comprising at least a cylinder, a cylinder head carrying a fuel injection means, a piston sliding in the cylinder, a combustion chamber defined on one side by the upper face of the piston comprising a projection extending in the direction of the cylinder head and arranged at the center of a concave bowl. The injection means injects fuel in at least two fuel jet with different injection angles, a lower jet having axis C1 and an upper jet having axis C2, at least two mixing zones of the combustion chamber, wherein one of the zones comprises a toroidal volume having center B into which the fuel jets of the lower jet are injected in such a way that axis C1 of the lower jets is contained between center B and the projection.

The fuel jets can be arranged axially above one another.

The injection means can comprise at least two injectors projecting fuel in a fuel jet sheet with different injection angles.

The angle of one of the sheets is at most 130° whereas the sheet angle of the other sheet is at least 130°.

The bowl can comprise a toroidal volume of radius R1 and R2, a bowl bottom diameter FD, a bowl opening diameter BD, a neck diameter GD, an upper injection diameter ID1, a developed length of the diametral section 2*Cb of the bowl, a projection height H and a bowl height L, and the dimensions of the bowl can meet at least one of the following conditions:

ratio BD/L is less than 6, preferably less than 4,
ratio FD/BD is less than 1,
ratio 2*Cb/BD is less than 2,
ratio GD/BD ranges between 0.7 and 1,
ratio H/L is greater than 50%, preferably greater than 60%,
ratio R2/R1 is less than 1, preferably less than 0.6,
ratio ID1/GD is greater than 1,
ID1 is less than $(GD+(2*Cb-GD)*2/3)$.

The bowl can comprise an angle of inclination (a3) for the inclined flank of the projection, an angle of inclination (a4) formed by the principal axis C1 of the fuel jets of the lower sheet injected into the torus by impacting the torus at a point (M) and by the tangent with impact point (M), an angle of inclination (a5) defined at the tangent of the outer rounded surface with the lateral wall, and the bowl can meet at least one of the following conditions:

a3 is substantially equal to a1,
a4 is greater than 80°,
a5 ranges between 0° and 90°, preferably substantially between 30° and 40°,
a6 ranges between 15° and 75°.

The invention also relates to an injection method for a compression-ignition direct-injection internal-combustion engine comprising at least a cylinder, a cylinder head carrying a fuel injector, a piston sliding in the cylinder, a combustion chamber having on one side an upper face of the piston comprising a projection extending in the direction of the cylinder head and arranged at the center of a concave bowl, the method injecting the fuel in at least two fuel jet sheets with different sheet angles, a lower sheet having a jet axis C1 and an upper sheet having a jet axis C2, wherein, for a position D of the piston disposed between the bottom of the bowl and the origin of the fuel jets of the upper sheet, which substantially corresponds to $D=L4+ID1/\text{tangent } a2$ where L4 is the height between the bowl bottom and the point of impact of the fuel jets of the upper sheet, ID1 is the upper injection diameter between the points of impact and a2 is the half angle at the top of the upper sheet, for injecting the fuel of the lower sheet into a zone comprising a toroidal volume of center B so that axis C1 of the fuel jets of the sheet is contained between center B and the projection.

BRIEF DESCRIPTION OF THE DRAWINGS

Other features and advantages of the invention will be clear from reading the description hereafter, given by way of non: limitative example, with reference to the accompanying figures wherein.

DETAILED DESCRIPTION OF THE INVENTION

Figure 1:
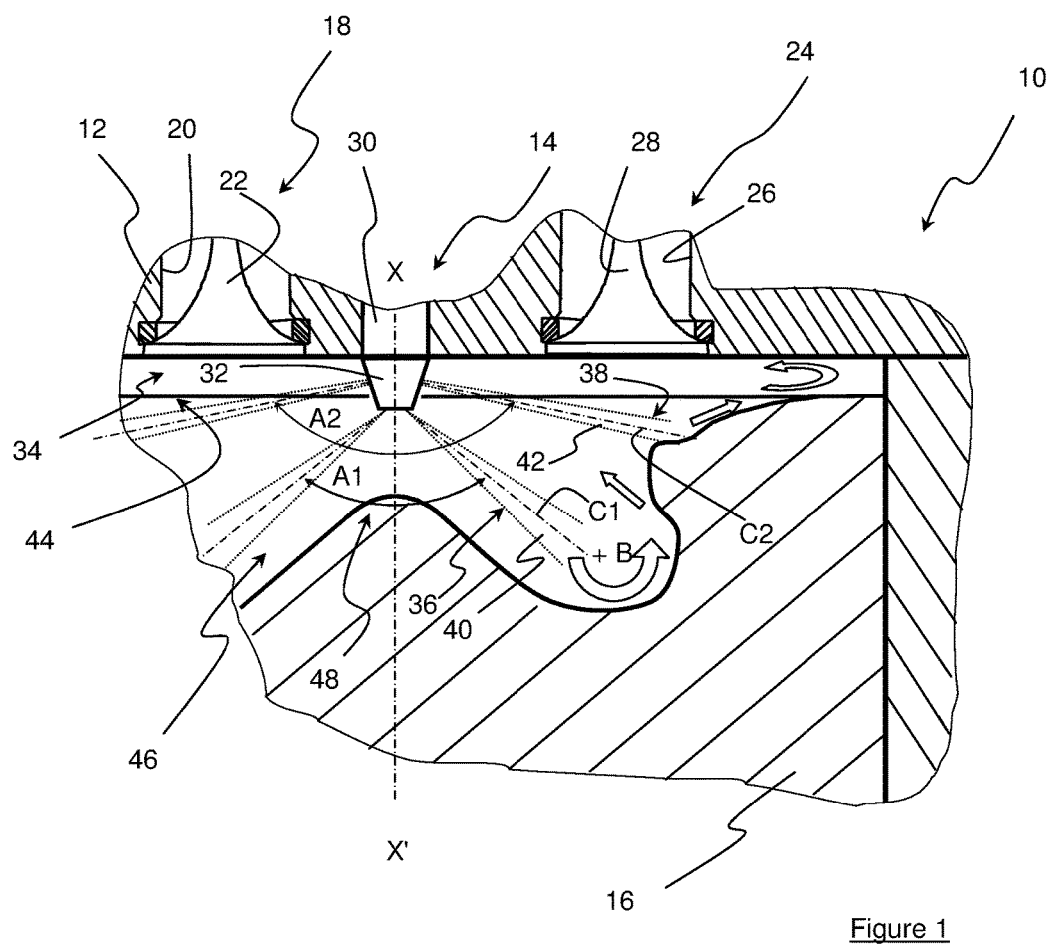
FIG. 1 shows an internal-combustion engine according to the invention.

With reference to FIG. 1, a compression-ignition direct-injection internal-combustion engine comprises at least a cylinder 10, a cylinder head 12 closing the cylinder in the upper part, a fuel injection means 14 carried by the cylinder head and a piston 16 having axis XX' sliding in the cylinder with a reciprocating rectilinear motion.

Fuel is understood to be a liquid fuel such as diesel fuel, kerosene or any other fuel with the physicochemical characteristics allowing operation of an engine of compression ignition type including a direct injection system for this fuel.

This engine also comprises a burnt gas exhaust means 18 having at least one exhaust pipe 20 with an opening can be controlled by any means such as an exhaust valve 22 for example and an intake means 24 for an oxidizer with at least one intake pipe 26 whose opening can be controlled by any means such as for example, an intake valve 28 for example.

An oxidizer is understood to be air at ambient pressure or supercharged air or a mixture of air (supercharged or not) and burnt gas.

The injection means comprise at least one fuel injector 30, preferably arranged along axis XX', whose nozzle 32 comprises a multiplicity of orifices through which the fuel is sprayed and projected in the direction of combustion chamber 34 of the engine.

It is from these injection means that the projected fuel forms at least two fuel jet sheets, here two sheets 36 and 38 of fuel jets 40 and 42, which, in the example shown, have a general axis merged with that of piston 16 while being axially positioned one above the other.

More precisely, sheet 36 which is closer to piston 16, is referred to as lower sheet in the description below, whereas sheet 38 which is further away from this piston, is referred to as upper sheet.

As can be seen in FIG. 1, these two sheets form sheet angles A1 and A2 different from one another. A sheet angle is understood to be the top angle formed by the cone originating from the injector, whose imaginary peripheral wall passes through all the axes C1 and C2 of fuel jets 40 and 42.

Advantageously, sheet angle A1 of the lower sheet is at most equal to 130°, preferably ranging between 40° and 130°, whereas sheet angle A2 of the upper sheet is at most equal to 180°, preferably ranging between 130° and 180°.

Figure 2:
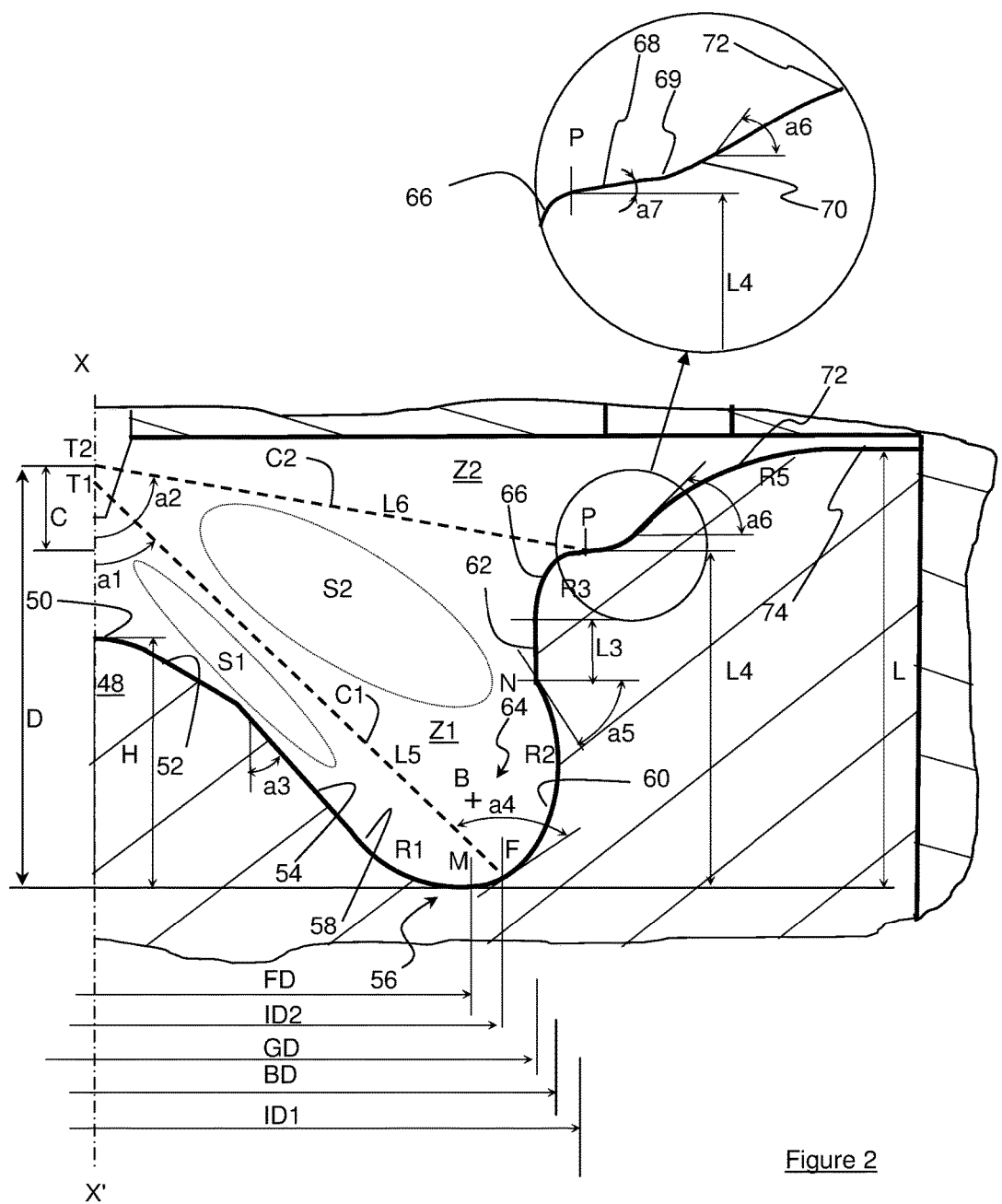
FIG. 2 is a large-scale partial view of a half section of the piston bowl profile of the engine of FIG. 1.

For simplification reasons, in the rest of the description, angle a1 corresponds to A1/2 and angle a2 corresponds to A2/2 (see FIG. 2).

The difference between the two sheet angles thus allow limiting fuel jet overlap between the two sheets and therefore formation of pollutants such as soot.

Of course, it is possible for the injection means injectors not to be arranged along axis XX', but in this case the general axis of the fuel jet sheets from the fuel injector is at least substantially parallel to this axis XX'.

Similarly, each sheet may be carried by a distinct injector (single-sheet injector) with dedicated targeting in distinct zones of the combustion chamber.

Combustion chamber 34 is defined by the inner face of cylinder head 12 opposite the piston, the circular inner wall of cylinder 10 and upper face 44 of piston 16.

This upper face of the piston comprises a concave bowl 46, whose axis is merged with that of the cylinder here, whose concavity is directed towards the cylinder head and which houses a projection 48 arranged substantially at the center of the bowl, which rises towards cylinder head 12, by being preferably coaxial with the axis of the fuel sheets from injector 30.

Of course, the axis of the bowl may not be coaxial with that of the cylinder. The main concept is the layout according to which the axis of the fuel jet sheet, the axis of the projection and the axis of the bowl are preferably coaxial.

With reference to FIG. 2, projection 48 is generally of truncated in shape and comprises a preferably rounded extended top 50, while extending symmetrically away from axis XX' towards the outside of piston 16, by a substantially rectilinear inclined surface 52 extending in an inclined flank 54 down to a bottom 56 of the bowl.

Of course, without departing from the scope of the invention, inclined surface 52 can be eliminated (zero length) and then inclined flank 54 connects the top of the projection to the bottom of the bowl.

In the example of FIG. 2, the bottom of the bowl is rounded with a concave rounded surface 58 in the form of an arc of a circle with radius R1, which is referred to as inner rounded surface and is connected to the bottom of inclined flank 54, and another concave rounded surface 60 in form of an arc of a circle with radius R2, which is referred to as outer rounded surface and is connected by one of its ends to the lower end of the inner rounded surface at a point M and by the other end thereof to a lateral wall 62, which is substantially vertical as illustrated, at a point N.

The two rounded surfaces 58 and 60 thus define the lower part of a toroidal volume, which is a torus of substantially cylindrical section 64 and a center B whose purpose is explained in the description below.

Lateral wall 62 extends away from axis XX', as a convex rounded surface 66 the in form of an arc of a circle with radius R3 which is referred to as re-entrant, extending leading to an inclined plane 68 linked to a concave inflection surface 69 connected to a substantially plane surface 70. This plane surface is continued by an outer convex surface which is 72 in the form of an arc of a circle with radius R5 that extends to a plane surface 74 extending up to the vicinity of the cylinder wall.

The combustion chamber thus comprises two distinct zones Z1 and Z2 that provide mixing of the oxidizer therein (air, supercharged or not, or mixture of air and recirculated burnt gas) with the fuel coming from the injector, as well as combustion of the fuel formed mixture thus.

Zone Z1, defined by projection 48, torus 64 at the bowl bottom, wall 62 and convex rounded surface 66, forms the lower zone of the combustion chamber associated with lower sheet 36 of fuel jets of axis C1, and zone Z2, defined by the inclined plane 68, concave surface 69, substantially plane surface 70, convex surface 72, plane surface 74, the peripheral inner wall of the cylinder and cylinder head 12, forms the upper zone of the chamber associated with upper sheet 38 of fuel jets of axis C2.

In this configuration, the bowl comprises, for a piston position close to the top dead center:

a bowl bottom diameter FD having a radius considered between axis XX' and the lowest point M of the bowl, that is at the intersection between the surfaces of radius R1 and R2, a bowl opening diameter BD with a radius in the vicinity of the bowl bottom and corresponding to a distance between axis XX' and the furthest point of outer concave surface 60, a neck diameter GD with a radius corresponding to the distance between axis XX' and vertical wall 62 defining the outlet section of this bowl, an upper injection diameter ID1 with a radius corresponding to the distance between axis XX' and the start of inflection surface 69 at point P between inclined plane 68 and concave surface 70 by having a length L6 of jets 38 between the origin T2 of axis C2 of the jets on the axis of the injector nozzle and point P, which meets the formula ID1/sinus a2, a length of the diametral half section Cb of the bowl, with of a length extending from the intersection of the projection top with axis XX' to the cylinder wall, a projection height H between the bowl bottom at point M and the top of the projection, a bowl height L between the bowl bottom at point M and plane surface 74, a junction height L3 corresponding to the extension of lateral wall 62 considered between the end of outer rounded surface 60 at point N and the start of outer rounded surface 66, a height L4 between point P and point M, an angle of inclination a3 relative to a vertical for inclined flank 54, an angle of inclination a4 formed by principal axis C1 of the fuel jets of lower sheet 36 which impact the torus and the tangent to impact point F which defines a length L5 of jets 40 between origin T1 of axis C1 of the jets on the axis of the injector nozzle and point F. This length L5 meets formula ID2/sinus a1, with ID2 corresponding to a lower injection diameter with a radius that corresponds to the distance between axis XX' and point F, an angle of inclination a5 considered is at the tangent outer rounded surface 60 with lateral wall 62 at point N, an angle of inclination a6 is rounded with respect to the horizontal and the tangent substantially to plane wall 70, and an angle of inclination a7 is rounded with respect to the horizontal and inclined plane 68 at intersection point P.

All these parameters are with respect to a position of piston 16 in the vicinity of the top dead center that corresponds to a distance D considered between point M and the origin T2 of axis C2 of jets 42.

More precisely, the distance D is equal to the sum of height L4 and height C, height C corresponding to the axial height between origin T2 and point P. This height corresponds to formula ID1/tangent a2.

Thus, the dimension and angle parameters of the bowl meet at least one of the following conditions:

angle a4 is greater than 80°, and passes more than half the fuel jet between center B of torus 64 and the projection, and more precisely the lower part at the level of point M, and thus to generating an aerodynamic upward motion in the torus towards the top of the cylinder, angle a5 must be positive and less than 90°. Preferably, it has to be of the order of 30° to 40° so to direct fuel jets 40 of the lower sheet 36 towards oxidizer volume S1 in order to use the oxidizer of this zone while limiting upflow of this fuel towards upper sheet 38, oxidizer volume S1 arranged between fuel jets 40 of the lower sheet is minimized, with a view to optimize the use of oxidizer in the chamber, the position of the top of projection 48 is as close as possible to nozzle 32 of injector 30 to limit the volume of oxidizer under the injector that will not be impacted by the fuel jets, which minimizes volume S1. Thus, ratio H/L is greater than 40% and preferably greater than 60%, angle a3 is substantially equal to or greater than angle a1 of the lower sheet (−10°<a3−a1<10°). This allows to use flank 54 of the projection to guide fuel jets 40 in torus 64 while enabling these jets to vaporize totally prior to impacting the piston, oxidizer volume S2 between the two sheets is non-zero since the interaction between the sheets is detrimental to the pollutants. Volume S2 however needs to be minimized. Therefore, junction length L3 between the torus and re-entrant 66 (convex rounded surface of center R3) is such that L3/(2*length of R2)<1 or (L3/length of R2<2) in order to ensure that oxidizer volume S2 available between the upper 38 and lower 36 sheets is low in relation to the fuel volume generated by the jets of the lower sheet, second combustion zone Z2 in the upper part of the piston starts from re-entrant 66 is for fuel jets 42 of upper sheet 38, the combustion volume of zone Z2 is at least equal to one tenth of the total volume of the bowl, the area referred to as the compressor area is formed by inclined plane 68, concave surface 69, plane surface 70, convex surface 72 and plane surface 74. Angle a6 ranges between 10° and 75°, which allows burst fuel jets 42 to create an aerodynamic motion above the piston and additionally to use the oxidizer in the compression area. There aerodynamics allows better fuel/oxidizer mixing above the piston, notably upon expansion, thus promoting oxidation of the burnt gas, in order to promote the impact of jets 42 on the compression area, a guiding surface 68 is provided between re-entrant 66 and surface 70. This guiding surface can be rounded in the continuation of the re-entrant or be substantially planar. The purpose of this guiding surface is to concentrate fuel jets 42 and to guide them towards convex surface 72. Thus, the guiding surface has an angle a7 at intersection point P whose difference with respect to sheet angle a2 is less than 45°, the position of inflection surface 69 is such that distances L5 and L6 are approximately of the same order (0.5<L5/L6<2). Thus, advantageously, the fuel jets will impact substantially at the same time the piston in the torus and the inflection zone respectively. More generally, diameter ID1 must be such that ID1/GD>1 and ID1<(GD+(Cb−GD)*⅔). This allows fuel jets 42 to optimize the aerodynamics above the piston.

Furthermore, ratio BD/L is less than 6, preferably less than 4, ratio R2/R1 is less than 1, preferably less than 0.6, ratio FD/BD is less than 1, ratio Cb/BD is less than 2 so as to maintain complete vaporization of the fuel and to prevent wetting of the cylinder wall, ratio GD/BD ranges between 0.7 and 1 for the torus aerodynamics and upflow of the fuel jets, ratio H/L is greater than 40%, preferably greater than 60% so as to minimize the oxidizer volume between the injector nozzle and the teat, ratio L5/L6 ranges between 0.5 and 2 for the impact of the two sheets at the same time, A1 ranges between 40° and 130° with a1=A1/2, A2 ranges between 130° and 180° with a2=A2/2, a3 is substantially equal to a1, a4 is greater than 80°, a5 ranges between 0° and 90°, preferably substantially between 30° and 40°, a6 ranges between 15° and 75°, a7−a2 is less than 45°, ratio ID1/GD is greater than 1, ID1 is less than (GD+(Cb−GD)*⅔).

Thus, by means of this bowl parametrization, the fuel jets of lower sheet 36 directly target torus 64 and they do not directly impact re-entrant 66.

Therefore, combustion of the lower fuel/oxidizer mixture occurs essentially in the torus volume whereas combustion of the upper fuel/oxidizer mixture occurs essentially in the compression area and above the piston.

Furthermore, the interaction of the upper sheet jets with the lower sheet jets is limited, which allows the fuel/oxidizer mixture to be homogenized while meeting the mechanical strength constraints at high load.

The invention claimed is:

1. A compression-ignition direct-injection internal-combustion engine comprising at least one cylinder, a cylinder head carrying fuel injection means, a piston sliding in the at least one cylinder, a combustion chamber defined on one side by an upper face of the piston comprising a projection extending in a direction of the at least one cylinder head and arranged at a center of a concave bowl, the fuel injection means projecting fuel in at least two fuel jet sheets at different sheet angles defined relative to a center axis of a cylinder, a lower sheet of a first jet axis and an upper sheet of a second jet axis, at least two mixing zones of the combustion chamber, wherein one of the zones comprises a toroidal volume having a center into which fuel jets of the lower sheet are injected so that axis of the lower sheet jets is contained between the center and the projection; and wherein the bowl comprises a toroidal volume of radius R1 and R2, a bowl bottom diameter FD, a bowl opening diameter BD, a neck diameter GD, an upper injection diameter ID1, a developed length of a diametral section 2*Cb of the bowl, a projection height H and a bowl height L, wherein the dimensions of the bowl meet at least one condition that ratio BD/L is less than 6; ratio FD/BD is less than 1; ratio 2*Cb/BD is less than 2; ratio GD/BD ranges between 0.7 and 1; ratio H/L is greater than 50%; ratio R2/R1 is less than 1; ratio ID1/GD is greater than 1; and ID1 is less than (GD+(2*Cb−GD)*⅔).

2. An internal-combustion engine as claimed in claim 1, wherein the fuel jet sheets are located axially above one another.

3. An internal-combustion engine as claimed in claim 2, wherein sheet angle of one of the sheets is not greater than 130° and sheet angle of the other sheet is at least 130°.

4. An internal-combustion engine as claimed in claim 1, wherein the fuel injection means comprises at least two injectors which project fuel in a fuel jet sheet at different sheet angles.

5. An internal-combustion engine as claimed in claim 2, wherein the fuel injection means comprises at least two injectors which project fuel in a fuel jet sheet at different sheet angles.

6. An internal-combustion engine as claimed in claim 5, wherein sheet angle of one of the sheets is not greater than 130° and sheet angle of the other sheet is at least 130°.

7. An internal-combustion engine as claimed in claim 4, wherein sheet angle of one of the sheets is not greater than 130° and sheet angle of the other sheet is at least 130°.

8. An internal-combustion engine as claimed in claim 1, wherein sheet angle of one of the sheets is not greater than 130° and sheet angle of the other sheet is at least 130°.

9. An internal combustion engine as claimed in claim 1, wherein the ratio BD/L is less than 4, the ratio H/L is greater than 60% and ratio R1/R2 is less than 0.6.

10. An internal-combustion engine as claimed in claim 1, wherein the bowl comprises an angle of inclination a3 for an inclined flank of projection, an angle of inclination a4 formed by a principal axis of fuel jets of the lower sheet injected into a torus by impacting the torus at a point and by a tangent impact point, an angle of inclination a5 considered at a tangent of an outer rounded surface with lateral wall, and wherein:

a3 is equal to a1;

a4 is greater than 80°;

a5 ranges between 0° and 90°;

a6 ranges between 15° and 75°; and a1 is an angle between the center axis and the first fuel jet axis.

11. An internal combustion engine as claimed in claim 10, wherein a5 ranges between 30° and 40°.

12. A method of injection for a compression-ignition direct-injection internal-combustion engine including at least one cylinder, a cylinder head carrying fuel injection means, a piston sliding in the at least one cylinder, a combustion chamber defined on one side by an upper face of the piston comprising a projection extending in a direction of the cylinder head and disposed at a center of a concave bowl, with the bowl comprising a toroidal volume of radius R1 and R2, a bowl bottom diameter FD, a bowl opening diameter BD, a neck diameter GD, an upper injection diameter ID1, a developed length of a diametral section 2*Cb of the bowl, a projection height H and a bowl height L, wherein the dimensions of the bowl meet at least one condition that of ratio BD/L is less than 6; ratio FD/BD is less than 1; ratio 2*Cb/BD is less than 2; ratio GD/BD ranges between 0.7 and 1; ratio H/L is greater than 50%; ratio R2/R1 is less than 1; ratio ID1/GD is greater than 1; and ID1 is less than (GD+(2*Cb−GD)*⅔), comprising, injecting the fuel in at least two fuel jet sheets having different sheet angles a1 and a2 which are measured respectively between an axis of a cylinder and a jet axis C1 and a jet axis C2, a lower sheet having the jet axis C1 and an upper sheet having the jet axis C2, wherein for a position D of piston considered between a bottom of the bowl and an origin of the fuel jets of the upper sheet, a D is equal to L4+ID1/tangent a2, L4 is a height between the bowl bottom and point of impact of the fuel jets of the upper sheet, ID1 is the upper injection diameter considered between impact points and a2 is a half angle at a top of the upper sheet; and injecting the fuel of the lower sheet into a zone comprising a toroidal volume having a center B so that axis C1 of the fuel jets of the sheets is contained between the center B and the projection.

13. A method in accordance with claim 12 comprising:
project fuel in the fuel sheets wherein one of the sheet angles is no greater than 130° and another of the sheet angles is at least 130°.

14. A method in accordance with claim 13, wherein a5 ranges between 30° and 40°.

15. A method in accordance with claim 12, wherein the bowl comprises an angle of inclination a3 for an inclined flank of projection, an angle of inclination a4 formed by jet axis C1 of fuel jets of the lower sheet injected into a torus impacts the torus at an impact point and by a tangent to the impact point, an angle of inclination a5 is considered at a tangent of an outer rounded surface with lateral wall, wherein:

a3 is substantially equal to a1;
a4 is greater than 80°;
a5 ranges between 0° and 90°; and
a6 ranges between 15° and 75°.

* * * * *